US012102586B2

(12) United States Patent
Lee

(10) Patent No.: US 12,102,586 B2
(45) Date of Patent: Oct. 1, 2024

(54) MOTION ASSISTANCE APPARATUS

(71) Applicant: SAMSUNG ELECTRONICS CO., LTD., Suwon-si (KR)

(72) Inventor: Youn Baek Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/991,873

(22) Filed: Nov. 22, 2022

(65) Prior Publication Data

US 2023/0090570 A1 Mar. 23, 2023

Related U.S. Application Data

(63) Continuation of application No. 16/149,325, filed on Oct. 2, 2018, now Pat. No. 11,517,492.

(30) Foreign Application Priority Data

Feb. 20, 2018 (KR) ........................ 10-2018-0019998

(51) Int. Cl.

*A61H 3/00* (2006.01)
*A61H 1/02* (2006.01)

(52) U.S. Cl.

CPC ............. *A61H 3/00* (2013.01); *A61H 1/0255* (2013.01); *A61H 1/0262* (2013.01); *A61H 2003/007* (2013.01); *A61H 2201/12* (2013.01); *A61H 2201/1215* (2013.01); *A61H 2201/14* (2013.01); *A61H 2201/149* (2013.01);

(Continued)

(58) Field of Classification Search

CPC ...... A61H 3/00; A61H 1/0255; A61H 1/0262; A61H 2003/007; A61H 2003/005; A61H 2201/12; A61H 2201/1215; A61H 2201/14; A61H 2201/149; A61H 2201/1628; A61H 2201/163; A61H 2201/164; A61H 2201/1642; A61H 2201/165; A61H 2201/1652; A61H 2201/1671;

(Continued)

(56) References Cited

U.S. PATENT DOCUMENTS 5,020,790 A * 6/1991 Beard ................... A61F 5/0102 623/24
7,883,546 B2 * 2/2011 Kazerooni ............. A61H 3/008 623/32

(Continued)

FOREIGN PATENT DOCUMENTS

JP 2012-100983 A 5/2012
JP 2013-059491 A 4/2013

(Continued)

OTHER PUBLICATIONS

U.S. Appl. No. 16/149,325, filed Oct. 2, 2018; Lee.

(Continued)

*Primary Examiner* — Tu A Vo
*Assistant Examiner* — Kelsey E Baller
(74) *Attorney, Agent, or Firm* — Nixon & Vanderhye P.C.

(57) ABSTRACT

A motion assistance apparatus may include a shank frame configured to support a shank of a user, a thigh frame configured to rotate relative to the shank frame and support a thigh of the user, and a driving frame configured to assist a motion of a hip joint of the user by transmitting power directly or indirectly to the shank frame.

12 Claims, 15 Drawing Sheets

(52) U.S. Cl.
CPC ................ *A61H 2201/1628* (2013.01); *A61H 2201/163* (2013.01); *A61H 2201/164* (2013.01); *A61H 2201/1642* (2013.01); *A61H 2201/165* (2013.01); *A61H 2201/1652* (2013.01); *A61H 2201/1671* (2013.01); *A61H 2201/169* (2013.01); *A61H 2201/5058* (2013.01)

(58) Field of Classification Search
CPC ...... A61H 2201/169; A61H 2201/5058; A61H 2201/1207; A61H 2201/50; A61H 2205/10
See application file for complete search history.

(56) References Cited

U.S. PATENT DOCUMENTS

| | | | | |
|---|---|---|---|---|
| 8,313,448 | B2 | 11/2012 | Shimada et al. | |
| 10,864,100 | B2 * | 12/2020 | Walsh | A61F 5/0102 |
| 2006/0241539 | A1 * | 10/2006 | Agrawal | A61H 1/024 602/26 |
| 2009/0301798 | A1 | 10/2009 | Yang et al. | |
| 2011/0306907 | A1 | 12/2011 | Ashihara et al. | |
| 2012/0289878 | A1 | 11/2012 | Schwenn et al. | |
| 2015/0313786 | A1 * | 11/2015 | Sano | A61H 3/00 602/16 |
| 2016/0374887 | A1 | 12/2016 | Wu | |
| 2017/0049659 | A1 | 2/2017 | Farris et al. | |

FOREIGN PATENT DOCUMENTS

| | | | |
|---|---|---|---|
| JP | 2014-054273 | A | 3/2014 |
| JP | 2016-064021 | A | 4/2016 |
| JP | 6197160 | B1 | 9/2017 |
| KR | 10-0957379 | B1 | 5/2010 |
| KR | 10-2013-0045776 | A | 5/2013 |
| KR | 10-2016-0119756 | A | 1/2016 |
| KR | 10-2017-0075699 | | 7/2017 |
| KR | 10-1765547 | B1 | 8/2017 |
| KR | 10-2019-0099918 | A | 8/2019 |

OTHER PUBLICATIONS

Chinese Office Action issued by China National Intellectual Property Administratin in Aug. 26, 2022 for the corresponding CN Patent Application No. 201811194745.0.
Aaron M. Dollar et al, Lower Extremity Exoskeletons and Active Orthoses: Challenges and State-of-the-Art, IEEE Transactions on Robotics, pp. 144-158, vol. 24, No. 1, Feb. 2008.
JP Official Action dated May 16, 2023 for JP Application No. 2019-010113.
Korean Notice of Allowance dated Oct. 25, 2023 for KR Application No. 10-2018-0019998.

* cited by examiner

MOTION ASSISTANCE APPARATUS

CROSS-REFERENCE TO RELATED APPLICATION

This application is a Continuation of U.S. application Ser. No. 16/149,325, filed Oct. 2, 2018, which claims priority to KR 10-2018-0019998, filed Feb. 20, 2018, the entire contents of which are all hereby incorporated herein by reference in their entireties.

BACKGROUND

1. Field

At least one example embodiment relates to a motion assistance apparatus.

2. Description of the Related Art

With the onset of rapidly aging societies, an increasing number of people may experience inconvenience and/or pain from joint problems. Thus, there may be a growing interest in walking assistance apparatuses enabling the elderly and/or patients having joint problems to walk with less effort.

SUMMARY

Some example embodiments relate to a motion assistance apparatus.

In some example embodiment, the motion assistance apparatus may include a shank frame configured to support a shank of a user; a thigh frame configured to rotate relative to the shank frame, and to support a thigh of the user; and a driving frame configured to assist a motion of a hip joint of the user by transmitting a power from the driving frame to the shank frame.

In some example embodiments, the thigh frame is configured to move relative to the driving frame.

In some example embodiments, the thigh frame includes a thigh support configured to support a rear surface of the thigh of the user.

In some example embodiments, the motion assistance apparatus further includes: a connector having a first end and a second end, the first end of the connector being connected to the driving frame and the second end of the connector being connected to the shank frame such that the connector is configured to transmit the power of the driving frame directly to the shank frame.

In some example embodiments, a length of the thigh frame is less than a length of the driving frame.

In some example embodiments, a first one of the driving frame and the thigh frame includes a protrusion, and a second one of the driving frame and the thigh frame includes a guide configured to receive the protrusion.

In some example embodiments, the guide includes a slot having an arcuate shape corresponding to a rotation axis of the thigh frame.

In some example embodiments, the connector is configured to connect the thigh frame and the driving frame such that the thigh frame and the driving frame rotate separately on parallel planes.

In some example embodiments, the connector is configured to have an elasticity.

In some example embodiments, the motion assistance apparatus further includes: a connector having a first end and a second end, the first end of the connector being connected to the driving frame and the second end of the connector being connected to the thigh frame such that the connector is configured to transmit the power of the driving frame indirectly to the shank frame via the thigh frame.

In some example embodiments, the connector is configured to connect the thigh frame and the driving frame such that the thigh frame and the driving frame rotate separately on parallel planes.

In some example embodiments, the connector is configured to have an elasticity.

In some example embodiments, the connector is a one-degree of freedom (1-DOF) rotating joint on a first side of the thigh frame.

In some example embodiments, the motion assistance apparatus further includes: a clasp configured to restrict a relative motion of the thigh frame with respect to the driving frame.

In some example embodiments, the clasp includes a fixing body rotatably connected to the driving frame, the fixing body having a head configured to attach to the thigh frame.

In some example embodiments, the clasp further includes a fixing spring configured to maintain an angle of the fixing body with respect to the driving frame when an external force is not applied to the fixing body.

In some example embodiments, an angle of the thigh frame with respect to the driving frame is variable while the driving frame is assisting the motion of the hip joint.

In some example embodiments, the motion assistance apparatus further includes: a knee joint driver configured to drive the thigh frame in a direction in which the thigh frame is extended with respect to the shank frame, while the user stands up from a sitting position, wherein the knee joint driver is configured to not transmit a power from the knee joint driver directly to the driving frame.

Other example embodiments relate to a motion assistance apparatus.

In some example embodiments, the motion assistance apparatus may include a shank frame configured to support a shank of a user; a thigh frame configured to rotate relative to the shank frame, and to support a thigh of the user; and a driver including, a driving end portion configured to rotate about a rotation axis coincident with a rotation axis of a hip joint of the user, and a pair of driving links including a first end and a second end, the first end of the pair of driving links being connected to the thigh frame by a first hinge and the second end of the pair of driving links being connected to the driving end portion by a second hinge.

In some example embodiments, the pair of driving links are configured to each have an elasticity.

Other example embodiments relate to a motion assistance apparatus.

In some example embodiments, the motion assistance apparatus includes a thigh frame having an upper support and a lower support, the upper support configured to support an upper portion of a femur of a user, and the lower support configured to support a lower portion of the femur of the user; and a first actuator corresponding to a hip joint of the user, the first actuator configured to generate a torque to rotate a driving frame with respect to a wearable portion attached to a waist of a user, the driving frame configured to transmit the torque to the lower support portion such that the thigh frame attached to the upper portion and lower portion of the femur of the user moves relative to the driving frame.

In some example embodiments, the thigh frame and the driving frame include a first end connected to a joint corresponding to a knee joint of the user, and a second end of the driving frame is connected to the first actuator such that the thigh frame extends between the upper support and the joint corresponding to the knee joint of the user and the driving frame extends between the first actuator corresponding to the hip joint of the user and the joint corresponding to the knee joint of the user.

In some example embodiments, a length of the thigh frame is less than a length of the driving frame.

In some example embodiments, the motion assistance apparatus further includes: a shank frame including at least a calf support configured to support a calf of a user, wherein the driving frame is configured to transmit a power from the first actuator to the shank frame.

In some example embodiments, the motion assistance apparatus further includes a connector connected between the driving frame and one of the thigh frame and the shank frame to transmit the power of the driving frame to the shank frame.

In some example embodiments, the connector is connected between the driving frame and the thigh frame such that the connector is configured to indirectly transmit the power of the driving frame to the shank frame via the thigh frame.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
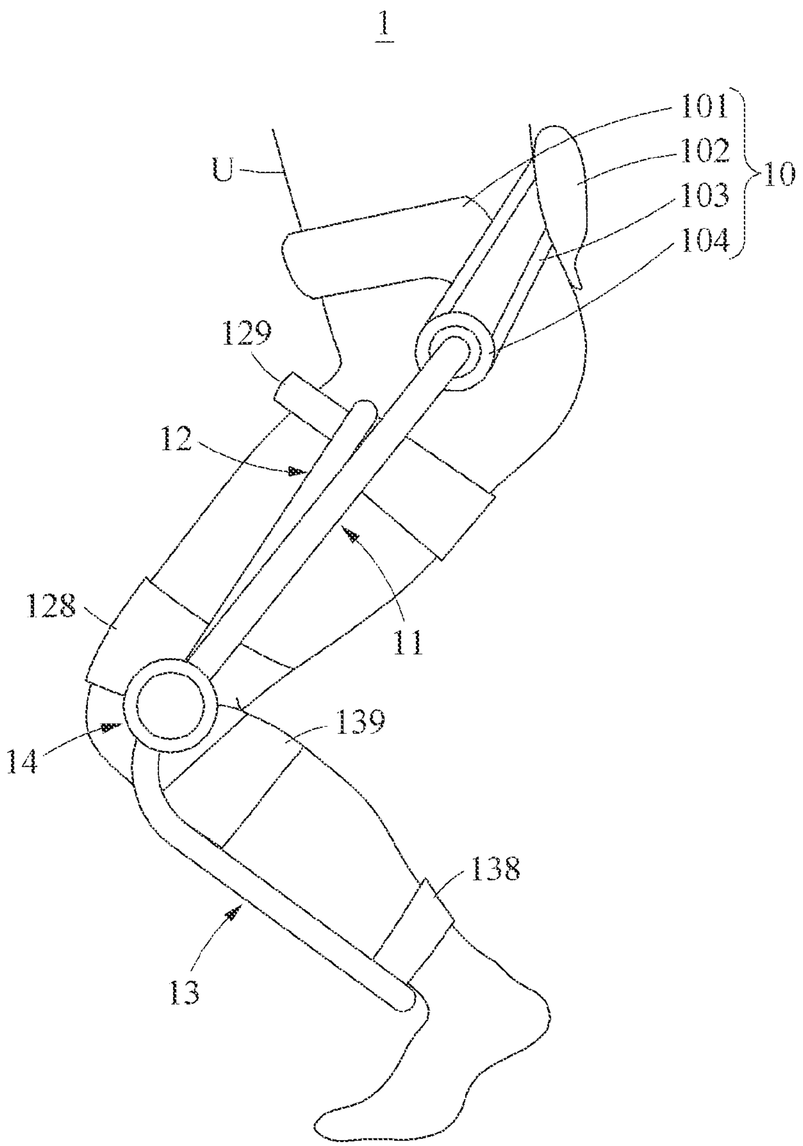
FIG. 1 is a side view illustrating a user wearing a motion assistance apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
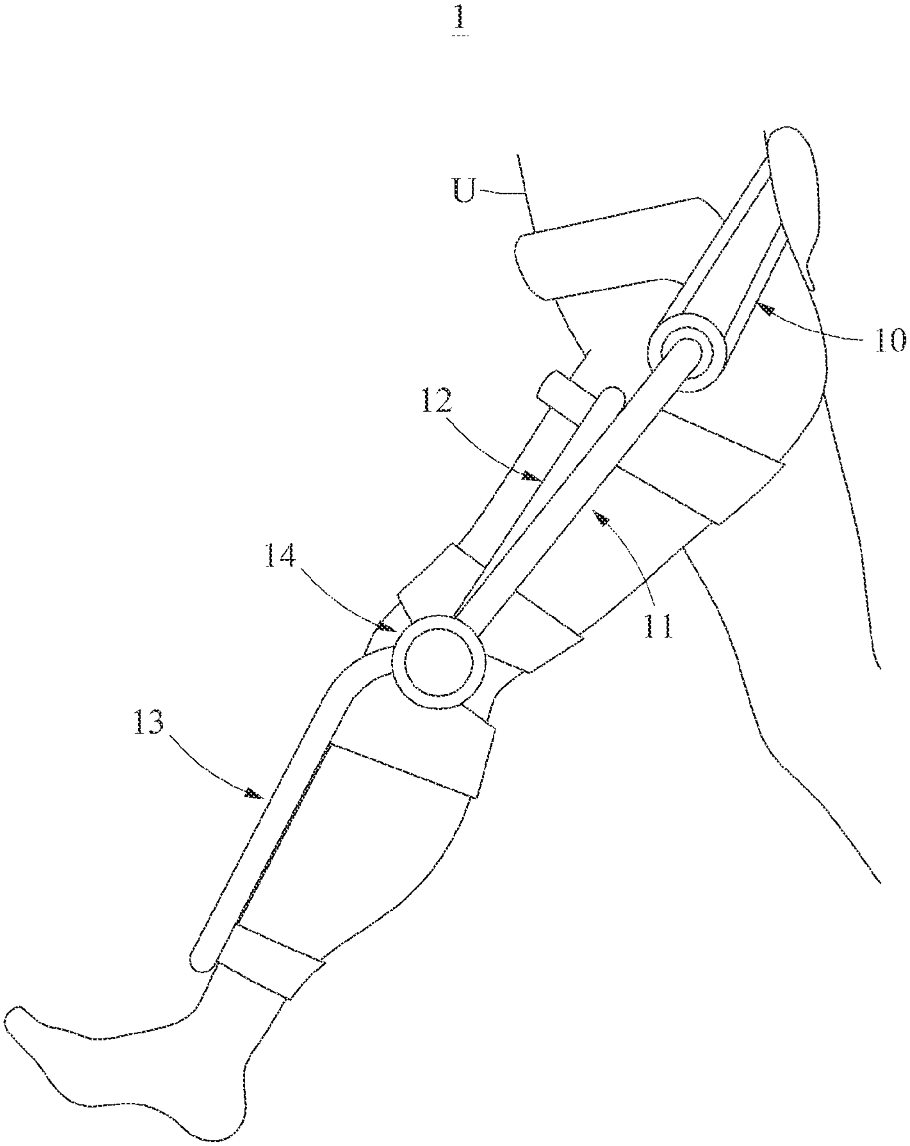
FIG. 2 is a side view illustrating an extension motion of a knee joint of a user wearing a motion assistance apparatus according to at least one example embodiment.
Figure 3:
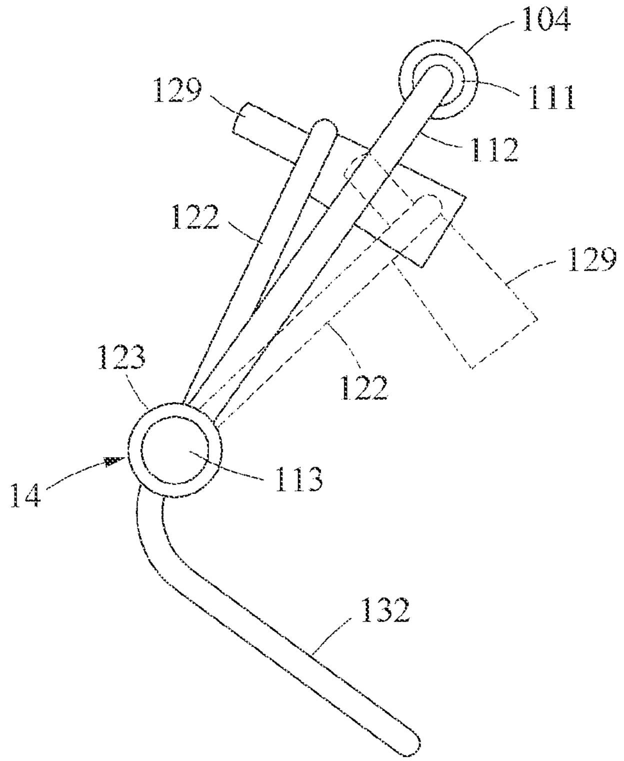
FIG. 3 is a side view illustrating a motion assistance apparatus including a thigh frame rotating relative to a driving frame according to at least one example embodiment.

FIG. 1 is a side view illustrating a user wearing a motion assistance apparatus according to at least one example embodiment, FIG. 2 is a side view illustrating an extension motion of a knee joint of the user wearing the motion assistance apparatus according to at least one example embodiment, and FIG. 3 is a side view illustrating the motion assistance apparatus including a thigh frame rotating relative to a driving frame according to at least one example embodiment.

Referring to FIGS. 1 through 3, a motion assistance apparatus 1 may be worn on a lower body of a user U to assist a motion of the user U. For example, the motion assistance apparatus 1 may assist a motion of a hip joint of the user U, and/or assist one or more of a flexion motion and an extension motion of a knee joint of the user U. The motion assistance apparatus 1 may assist the hip joint and/or the knee joint, as needed by the user U. The motion assistance apparatus 1 may include a wearable portion 10, a driving frame 11, a thigh frame 12, a shank frame 13, and a joint 14. The joint 14 refers to a portion to which the thigh frame 12 and the shank frame 13 are connected, and an end portion of the driving frame 11 may be connected to the joint 14.

The wearable portion 10 may be attached to a body part of the user U. For example, the wearable portion 10 may enclose a waist of the user U. The wearable portion 10 may transmit power to the driving frame 11 to assist a motion of the hip joint of the user U.

The wearable portion 10 may include a front frame 101, a rear frame 102, an extension frame 103, and a hip joint driver 104.

The front frame 101 and the rear frame 102 may cover a front side and a rear side of the user U, respectively. A space between the front frame 101 and the rear frame 102 may be adjusted based on a body size of the user U. For example, although not shown in the drawings, a band with an adjustable length may be provided between the front frame 101 and the rear frame 102. The front frame 101 and the rear frame 102 may each include a cushioning member (not shown) on a side facing the user U.

The extension frame 103 may protrude from one of the front frame 101 and the rear frame 102. For example, the extension frame 103 may protrude downward from one of the front frame 101 and the rear frame 102, to match a rotation axis of the driving frame 11 to a rotation axis of the hip joint of the user U.

The hip joint driver 104 may rotate the driving frame 11. The hip joint driver 104 may be on the extension frame 103.

Meanwhile, the front frame 101, the rear frame 102 and the extension frame 103 may be provided as an integral body.

The driving frame 11 may assist the motion of the hip joint of the user U. In the example of FIG. 1, the driving frame 11 may rotate clockwise and/or counterclockwise with respect to the wearable portion 10. The driving frame 11 may transmit the power directly or indirectly to the shank frame 13. Similarly, the power generated by the shank frame 13 may be transmitted directly or indirectly to the driving frame 11. The driving frame 11 may include a first driving frame end portion 111, a driving frame body 112, and a second driving frame end portion 113.

The first driving frame end portion 111 may be connected to the hip joint driver 104. The second driving frame end portion 113 may be connected to an end portion of the thigh frame 12 and/or an end portion of the shank frame 13. The driving frame body 112 may be a longitudinal member that connects the first driving frame end portion 111 and the second driving frame end portion 113. The driving frame body 112 may include a length adjusting device (not shown). The user U may adjust a length of the driving frame body 112 based on a length of the thigh of the user U through the length adjusting device.

The thigh frame 12 may support the thigh of the user U. The thigh frame 12 may move relative to the driving frame 11. The thigh frame 12 may rotate relative to the driving frame 11 and/or the shank frame 13. For example, the thigh frame 12 may be connected to the driving frame 11 and/or the shank frame 13 by a hinge. That is, an angle between the thigh frame 12 and the shank frame 13 and an angle between the thigh frame 12 and the driving frame 11 may change.

A length of the thigh frame 12 may be less than the length of the driving frame 11, and thus interference between the thigh frame 12 and a body of the user U may decrease while the thigh frame 12 rotates relative to the driving frame 11.

The thigh frame 12 may include a thigh frame body 122, a thigh frame end portion 123, and a thigh support 128, 129.

The thigh frame end portion 123 may be rotatably connected to the shank frame 13. The thigh frame body 122 may be a longitudinal member that protrudes from the thigh frame end portion 123 toward the wearable portion 10. The thigh support 128, 129 may be connected to the thigh frame body 122, and support a rear surface of the thigh of the user U. For example, the thigh support 128, 129 may be an elastic band. The thigh support 128, 129 may include a length adjusting device (not shown) to adjust a circumference thereof based on a size of the thigh of the user U. A plurality of thigh supports 128, 129 may be provided at intervals to stably support the thigh of the user U. The thigh support 128, 129 may include a first thigh support 128 relatively close to the knee joint of the user U, and a second thigh support 129 relatively far away from the knee joint of the user U.

The shank frame 13 may support a shank of the user U. The shank frame 13 may be rotatably connected to the thigh frame 12. The shank frame 13 may rotate relative to the thigh frame 12, thereby assisting the flexion motion and/or the extension motion of the knee joint of the user U. A rotation axis of the shank frame 13 may be approximately coincident with a rotation axis of the knee joint of the user U.

Figure 4:
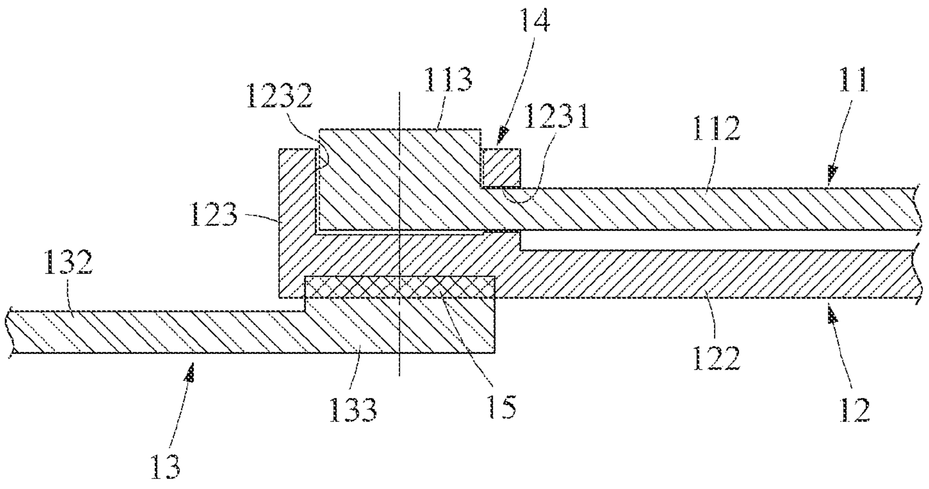
FIG. 4 is a cross-sectional view illustrating a motion assistance apparatus according to at least one example embodiment.

The shank frame 13 may include a shank frame body 132 and a shank frame end portion 133 of FIG. 4.

The shank frame end portion 133 of FIG. 4 may be rotatably connected to the thigh frame 12. The shank frame body 132 may be a longitudinal member that protrudes from the shank frame end portion 133 in a direction away from the wearable portion 10. A shank support 138, 139 may be connected to the shank frame body 132, and support the shank and a calf of the user U. For example, the shank support 138, 139 may be an elastic band. The shank support 138, 139 may include a length adjusting device (not shown) to adjust a circumference thereof based on a size of the shank of the user U. A plurality of shank supports 138, 139 may be provided at intervals to stably support the shank of the user U. The shank support 138, 139 may include a first shank support 138 relatively far away from the knee joint of the user U, and a second shank support 139 relatively close to the knee joint of the user U.

One of the thigh frame 12 and the shank frame 13 may include a knee joint driver 15 of FIG. 4. The knee joint driver 15 may adjust the angle between the thigh frame 12 and the shank frame 13, thereby assisting a motion of the knee joint of the user U.

The joint 14 may be a portion to which the thigh frame 12 and the shank frame 13 are connected. For example, the driving frame 11 may also be rotatably connected to the joint 14. Of course, only the thigh frame 12 and the shank frame 13 may be rotatably connected to the joint 14.

Hereinafter, a mechanism in which the motion assistance apparatus 1 decouples a hip joint motion assistance and a knee joint motion assistance will be described in detail.

The motion assistance apparatus 1 may assist a motion of the hip joint by adjusting an angle between the wearable portion 10 and the driving frame 11. Further, the motion assistance apparatus 1 may assist the motion of the hip joint by adjusting an angle between the thigh frame 12 and the shank frame 13. The motion assistance apparatus 1 may be in a vicinity of the thigh of the user U, and decouple the hip joint motion assistance and the knee joint motion assistance through the driving frame 11 and the thigh frame 12 that may rotate relative to each other.

For example, a force used to assist the knee joint when the user U stands up from a sitting position to a standing erect position may be about two or three times greater than a force used to assist the knee joint when the user U walks. That is, a torque applied between the thigh frame 12 and the shank frame 13 while the user U stands up from a sitting position may be much greater than a torque applied between the wearable portion 10 and the driving frame 11 while the user U is walking. Meanwhile, in an example, the thigh frame 12 may be relatively rotatably connected to the driving frame 11, rather than being rigidly connected thereto. Thus, a force applied to the thigh frame 12 may not be transmitted entirely to the driving frame 11. That is, most of the force applied to the thigh frame 12 may be utilized to press the thigh, and the force transmitted from the thigh frame 12 to the wearable portion 10 through the driving frame 11 may decrease greatly.

Meanwhile, in a case of a motion assistance apparatus employing a structure in which a thigh frame and a driving frame are rigidly connected, the driving frame and a wearable portion may need to be designed to each have a sufficiently great rigidness in view of a force transmitted from the thigh frame to the wearable portion while the user U stands up from a sitting position. However, according to at least one example embodiment, the driving frame 11 and the wearable portion 10 may be designed to each have a relatively low rigidness and a relatively low weight in view of only the force transmitted between the driving frame 11 and the wearable portion 10 during a walking process of the user U. Thus, an overall weight of the motion assistance apparatus 1 may be reduced.

Further, when assisting the knee joint, by reducing transmission of the force, applied to the thigh frame 12 of the motion assistance apparatus 1, to the wearable portion 10, the wearable portion 10 may be prevented from being separated upward from the user U while the user U stands up from a sitting position, and a wearability that the user U feels may improve.

Meanwhile, when the motion assistance apparatus 1 assists the user U in a sitting position to stand up, the motion assistance apparatus 1 may transmit power to the user U by the following mechanism. First, the thigh frame 12 may rotate in a direction of extension. Here, the direction of extension refers to a direction in which the thigh frame 12 rotates counterclockwise about the joint 14, in the example of FIG. 3. That is, the thigh frame 12 may press a rear surface of the thigh of the user U. In this example, an upper body of the user U may move upward, and the wearable portion 10 worn on the upper body of the user U may move upward along with the upper body of the user U. Thus, the driving frame 11 connected to the wearable portion 10 may rotate after the thigh frame 12. That is, since the thigh frame 12 is not rigidly connected to the driving frame 11, the driving frame 11 and the wearable portion 10 may first move upward before the upper body of the user U moves upward, whereby a separation of the wearable portion 10 from the upper body of the user U may be prevented.

FIG. 4 is a cross-sectional view illustrating a motion assistance apparatus according to at least one example embodiment.

Referring to FIG. 4, the second driving frame end 113, the thigh frame end portion 123, and the shank frame end portion 133 may be adjacent to each other. The second driving frame end 113, the thigh frame end portion 123, and the shank frame end portion 133 may constitute the joint 14 of the motion assistance apparatus 1.

The motion assistance apparatus 1 may include a connector with a first end connected to the driving frame 11 and a second end connected to the shank frame 13, the connector configured to transmit the power of the driving frame 11 directly to the shank frame 13. In an example, the connector may be the thigh frame end portion 123.

The thigh support 129 of FIG. 3 may be positioned farther than the connector 123, from a rotation axis of the shank frame 13. By the above structure, a moment arm of the thigh support 129 of FIG. 3 may increase and a force applied to the thigh support 129 when the motion assistance apparatus 1 of FIG. 3 assists the user U to stand up from a sitting position may be reduced.

The connector 123 may include a first connecting hole 1231 and a second connecting hole 1232.

The first connecting hole 1231 may guide a path along which the driving frame 11 rotates with respect to the thigh frame 12. For example, the first connecting hole 1231 may be formed in a circumferential direction about the rotation axis of the thigh frame 12. A width of the first connecting hole 1231 may be approximately the same as a width of the driving frame body 112. The first connecting hole 1231 may assist the driving frame 11 to rotate with respect to the thigh frame 12 without shaking.

The second connecting hole 1232 may prevent a separation of the driving frame 11 from the thigh frame 12. For example, the second driving frame end 113 may protrude upward from the driving frame body 112, and the second connecting hole 1232 may enclose the second driving frame end 113. A diameter of the second connecting hole 1232 may be approximately the same as a diameter of the second driving frame end 113. The second connecting hole 1232 may assist the driving frame 11 to rotate with respect to the thigh frame 12 without shaking.

Bearings (not shown) to reduce a friction between the driving frame 11 and the thigh frame 12 may be provided on inner sides of the first connecting hole 1231 and the second connecting hole 1232.

The knee joint driver 15 may drive the thigh frame 12 in a direction in which the thigh frame 12 extends with respect to the shank frame 13, while the user U stands up from a sitting position. Meanwhile, the knee joint driver 15 may not transmit the power directly to the driving frame 11.

The knee joint driver 15 may be provided in one of the thigh frame 12 and the shank frame 13. For example, the knee joint driver 15 may be provided in the thigh frame end portion 123. The knee joint driver 15 may be, for example, a motor.

Figure 5:
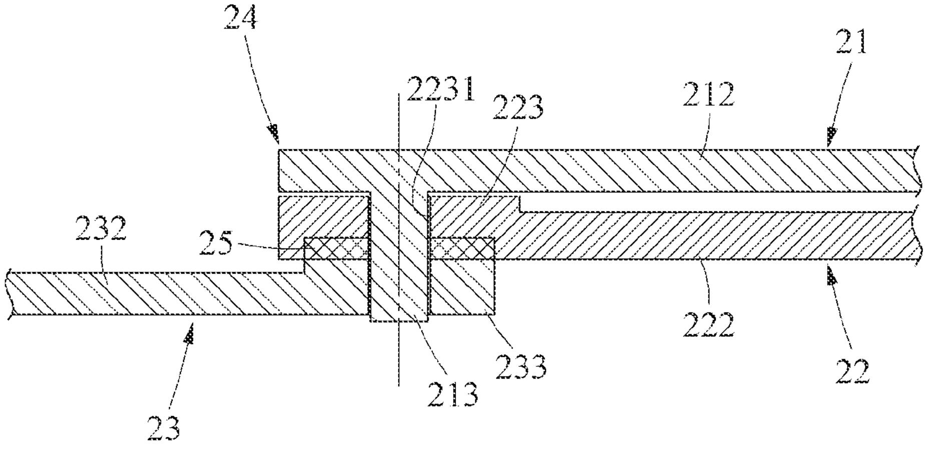
FIG. 5 is a cross-sectional view illustrating a motion assistance apparatus according to at least one example embodiment.

FIG. 5 is a cross-sectional view illustrating a motion assistance apparatus according to at least one example embodiment.

Referring to FIG. 5, a motion assistance apparatus may include a driving frame 21, a thigh frame 22, and a shank frame 23. A driving frame end portion 213, a thigh frame end portion 223, and a shank frame end portion 233 may constitute a joint 24 of the motion assistance apparatus.

The motion assistance apparatus may include a connector with a first end connected to the driving frame 21 and a second end connected to the shank frame 23, the connector configured to transmit power of the driving frame 21 directly to the shank frame 23. In an example, the connector may be the thigh frame end portion 223. The first end of the connector 223 may be connected to the driving frame 21 and the second end of the connector 223 may be connected to the shank frame 23. The connector 223 may include a connecting hole 2231.

The connecting hole 2231 may fix a portion of the driving frame 21. For example, the driving frame end portion 213 of the driving frame 21 may protrude downward from a driving frame body 212, penetrate through the thigh frame 22, and be connected directly to the shank frame 23. The connecting hole 2231 may enclose the driving frame end portion 213. A diameter of the connecting hole 2231 may be approximately the same as a diameter of the driving frame end portion 213.

Figure 6:
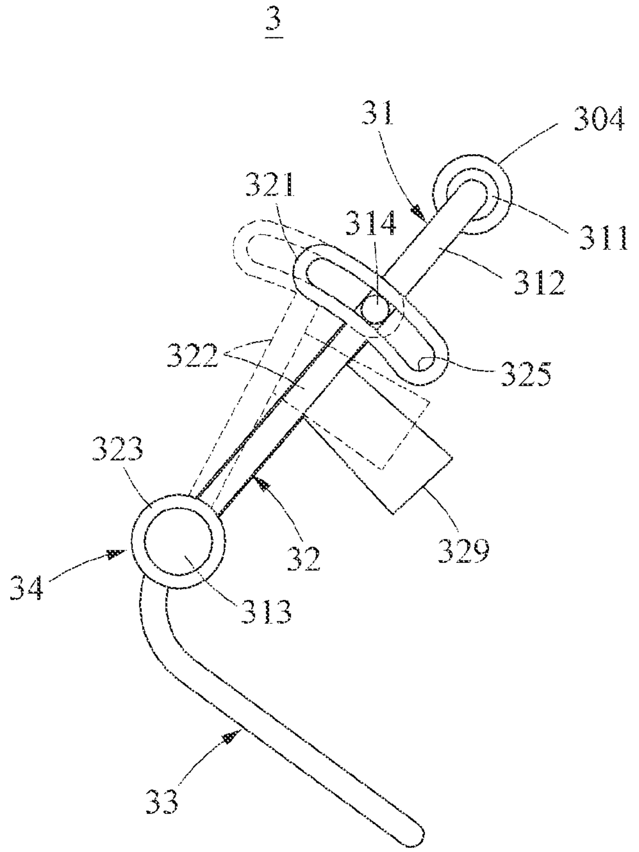
FIG. 6 is a side view illustrating a motion assistance apparatus including a thigh frame rotating relative to a driving frame according to at least one example embodiment.
Figure 7:
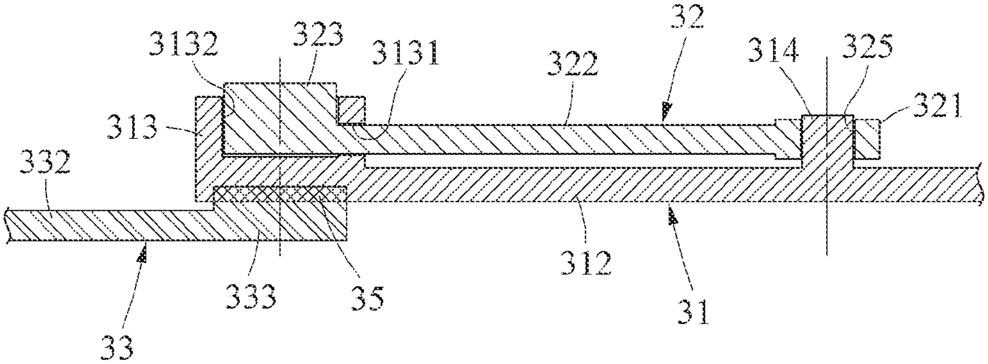
FIG. 7 is a cross-sectional view illustrating a motion assistance apparatus according to at least one example embodiment.

FIG. 6 is a side view illustrating a motion assistance apparatus including a thigh frame rotating relative to a driving frame according to at least one example embodiment, and FIG. 7 is a cross-sectional view illustrating the motion assistance apparatus according to at least one example embodiment.

Referring to FIGS. 6 and 7, a motion assistance apparatus 3 may include a hip joint driver 304, a driving frame 31, a thigh frame 32, a shank frame 33, a joint 34, and a knee joint driver 35. The driving frame 31 may include a first driving frame end portion 311, a driving frame body 312, a second driving frame end portion 313, and a protrusion 314.

The thigh frame 32 may include a guide 321, a thigh frame body 322, and a thigh frame end portion 323.

The shank frame 33 may include a shank frame body 332 and a shank frame end portion 333. The joint 34 may be a portion to which the driving frame 31, the thigh frame 32, and the shank frame 33 are connected.

One of the driving frame 31 and the thigh frame 32 may include a protrusion, and the other one of the driving frame 31 and the thigh frame 32 may include a guide to receive the protrusion. Hereinafter, for ease of description, an example in which the driving frame 31 includes the protrusion 314 and the thigh frame 32 includes the guide 321 will be described. However, example embodiments are not limited thereto.

The protrusion 314 may protrude from a first side of the driving frame body 312. The protrusion 314 may have, for example, a cylindrical shape.

The guide 321 may receive the protrusion 314. The guide 321 may assist one of the driving frame 31 and the thigh frame 32 to rotate along a set path with respect to the other one of the driving frame 31 and the thigh frame 32. For example, the guide 321 may resist (or, alternatively, prevent) a separation of the thigh frame 32 from the driving frame 31. The guide 321 may include a slot 325 having an arcuate shape about a rotation axis of the thigh frame 32. A width of the slot 325 may be approximately the same as a diameter of the protrusion 314. Both end portions of the protrusion 314 may be in contact with the slot 325.

The protrusion 314 and the guide 321 may increase a contact area between the driving frame 31 and the thigh frame 32, thereby dispersing a force. The protrusion 314 and the guide 321 may improve a durability of the motion assistance apparatus 3.

The motion assistance apparatus 3 may include a connector with a first end connected to the driving frame 31 and a second end connected to the shank frame 33, the connector configured to transmit power of the driving frame 31 directly to the shank frame 33. In an example, the connector may be the knee joint driver 35. The connector 35 may be provided in one of the driving frame 31 and the shank frame 33.

A thigh support 329 may be positioned farther than the connector 35, from a rotation axis of the shank frame 33.

The second driving frame end portion 313 may include a first connecting hole 3131 and a second connecting hole 3132.

The first connecting hole 3131 may guide a path along which the thigh frame 32 rotates with respect to the driving frame 31. For example, the first connecting hole 3131 may be formed in a circumferential direction about a rotation axis of the driving frame 31. The first connecting hole 3131 may have a width approximately the same as a width of the thigh frame body 322.

The second connecting hole 3132 may prevent a separation of the thigh frame 32 from the driving frame 31. For example, the thigh frame end portion 323 may protrude upward from the thigh frame body 322, and the second connecting hole 3132 may enclose the thigh frame end portion 323. A diameter of the second connecting hole 3132 may be approximately the same as a diameter of the thigh frame end portion 323.

Figure 8:
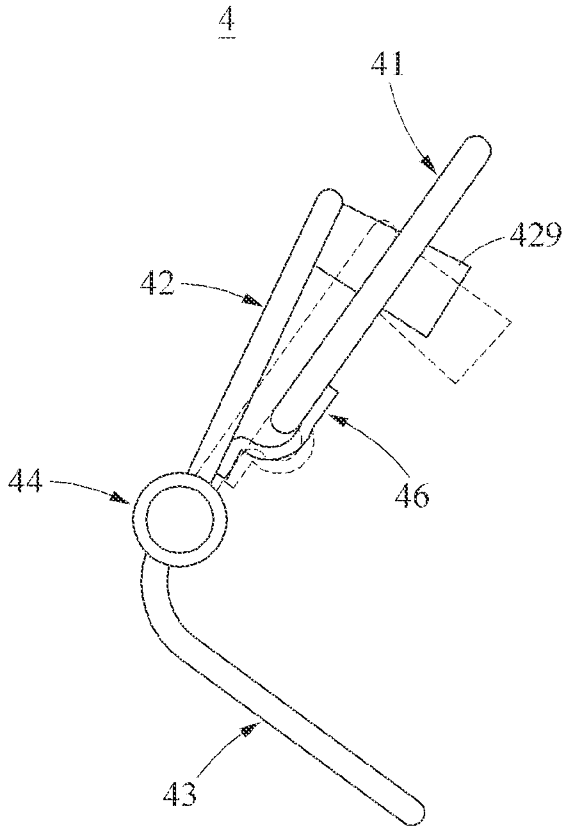
FIG. 8 is a side view illustrating a motion assistance apparatus including a thigh frame rotating relative to a driving frame according to at least one example embodiment.

FIG. 8 is a side view illustrating a motion assistance apparatus including a thigh frame rotating relative to a driving frame according to at least one example embodiment.

Referring to FIG. 8, a motion assistance apparatus 4 may include a driving frame 41, a thigh frame 42, a shank frame 43, a joint 44, and a connector 46. The joint 44 may be a portion to which the thigh frame 42 and the shank frame 43 are rotatably connected.

The connector 46 may connect the driving frame 41 and the thigh frame 42. The connector 46 may assist one of the driving frame 41 and the thigh frame 42 to rotate relative to the other one of the driving frame 41 and the thigh frame 42. The connector 46 may have an elasticity. In the example of FIG. 8, the connector 46 may extend when an angle between the driving frame 41 and the thigh frame 42 increases, and the connector 46 may contract when the angle between the driving frame 41 and the thigh frame 42 decreases. The connector 46 may assist the driving frame 41 and the thigh frame 42 to rotate separately on parallel planes. For example, the connector 46 may be a flat spring that connects the driving frame 41 and the thigh frame 42.

The connector 46 may provide a compliance such that the thigh frame 42 may move somewhat flexibly with respect to the driving frame 41 based on a deformation of a body according to a posture and/or a wearing state of the user, thereby improving a user wearability. Further, when an external force is not applied to the connector 46, the connector 46 may provide an elastic restoring force such that the thigh frame 42 may be in close contact with the driving frame 41.

Meanwhile, based on a magnitude of the force transmitted to the connector 46, a degree of the relative motion between the driving frame 41 and the thigh frame 42 may change. For example, a relatively small force may be applied to the connector 46 for a walking assistance requiring a small torque, and thus a relative motion may occur between the driving frame 41 and the thigh frame 42 with a small degree. Conversely, a relatively great force may be applied to the connector 46 when assisting a motion of standing up from a sitting position, which requires a great torque, and thus a relative motion may occur between the driving frame 41 and the thigh frame 42 with a great degree. Hence, by adjusting an elastic coefficient of the connector 46 appropriately, transmission of the force, applied to the thigh frame 42, to the driving frame 41 may be sufficiently reduced when assisting the motion of standing up from a sitting position, and the relative motion between the driving frame 41 and the thigh frame 42 may be sufficiently reduced when assisting the walking motion, whereby a user inconvenience caused by the relative motion occurring between the two frames 41 and 42 may be reduced.

A first end of the connector 46 may be connected to the driving frame 41 and a second end of the connector 46 may be connected to the thigh frame 42, whereby the connector 46 may transmit power of the driving frame 41 indirectly to the shank frame 43 through the thigh frame 42. For example, when the power is transmitted between the driving frame 41 and the thigh frame 42, a magnitude of the power may be reduced by the connector 46. By the above structure, although a relatively great force is applied to assist a knee joint, that is, although a relatively great force is applied to the thigh frame 42, a magnitude of the force transmitted to the driving frame 41 may be reduced.

A thigh support 429 may be positioned farther than the connector 46, from a rotation axis of the shank frame 43. By the above structure, the power transmission between the driving frame 41 and the shank frame 43 may be performed relatively efficiently, when compared to the power transmission between the driving frame 41 and the thigh frame 42. That is, the driving frame 41 and the thigh frame 42 may be decoupled, and thus a magnitude of the force applied to the thigh frame 42 may be reduced while the force is transmitted to the driving frame 41, and vice versa.

Figure 9:
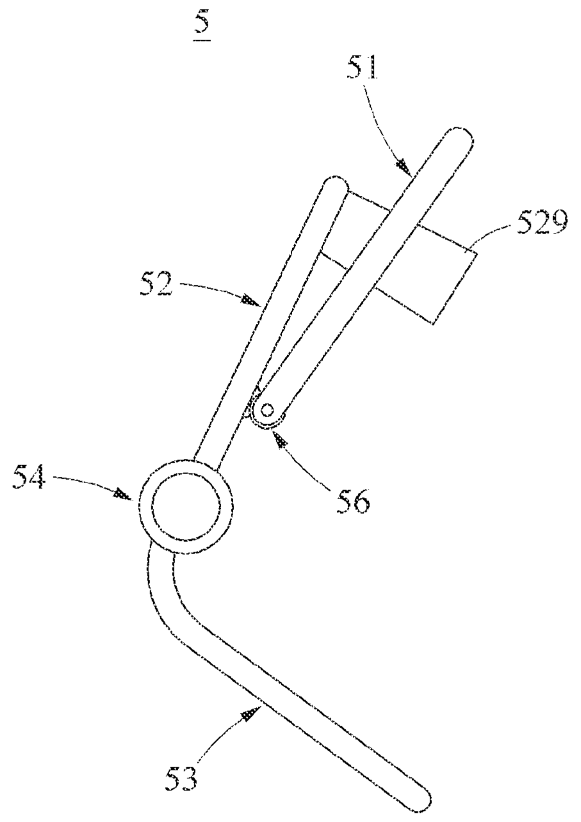
FIG. 9 is a side view illustrating a motion assistance apparatus according to at least one example embodiment.

FIG. 9 is a side view illustrating a motion assistance apparatus according to at least one example embodiment.

Referring to FIG. 9, a motion assistance apparatus 5 may include a driving frame 51, a thigh frame 52, a shank frame 53, a joint 54, and a connector 56. The joint 54 may be a portion to which the thigh frame 52 and the shank frame 53 are rotatably connected. A thigh support 529 may be positioned farther than the connector 56, from a rotation axis of the shank frame 53.

The connector 56 may be a one-degree of freedom (1-DOF) rotating joint on a first side of the thigh frame 42. For example, the connector 56 may be a hinge. The connector 56 may implement a relative rotation between the driving frame 51 and the thigh frame 52. The connector 56 may connect the driving frame 51 and the thigh frame 52 such that the driving frame 51 may perform a 1-DOF rotational motion with respect to the thigh frame 52, and the driving frame 51 and the thigh frame 52 may rotate separately on parallel planes. The connector 56 may assist the driving frame 51 and the thigh frame 52 to rotate separately on planes parallel to a sagittal plane of the user U of FIG. 1.

By the above structure, a thigh and a calf of the user may rotate in the same direction, and thus the motion assistance apparatus 5 may efficiently transmit the power to a lower body of the user.

Figure 10:
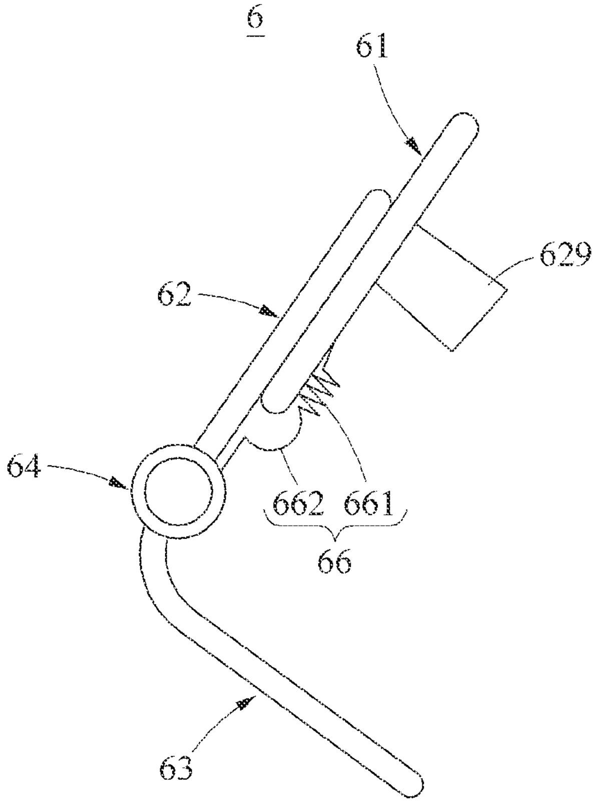
FIG. 10 is a side view illustrating a motion assistance apparatus according to at least one example embodiment.

FIG. 10 is a side view illustrating a motion assistance apparatus according to at least one example embodiment.

Referring to FIG. 10, a motion assistance apparatus 6 may include a driving frame 61, a thigh frame 62, a shank frame 63, a joint 64, and a connector 66. The joint 64 may be a portion to which the thigh frame 62 and the shank frame 63 are rotatably connected. A thigh support 629 may be positioned farther than the connector 66, from a rotation axis of the shank frame 63.

A first end of the connector 66 may be connected to the driving frame 61 and a second end of the connector 66 may be connected to the joint 64, whereby the connector 66 may transmit power of the driving frame 61 to the shank frame 63. For example, the second end of the connector 66 may be connected to the shank frame 63 of the joint 64, whereby the connector 66 may transmit the power of the driving frame 61 directly to the shank frame 63. In another example, the second end of the connector 66 may be connected to the thigh frame 62 of the joint 64, whereby the connector 66 may transmit the power of the driving frame 61 indirectly to the shank frame 63.

The connector 66 may have an elasticity. The connector 66 may include a linear spring 661 and a flat spring 662.

The linear spring 661 may be between the driving frame 61 and the thigh frame 62 to absorb a longitudinal position change between the driving frame 61 connected to a hip joint and the thigh frame 62 based on a wearing state and a posture.

The flat spring 662 may implement a relative rotation between the driving frame 61 and the thigh frame 62. The flat spring 662 may be connected to a first end of the linear spring 661.

Figure 11:
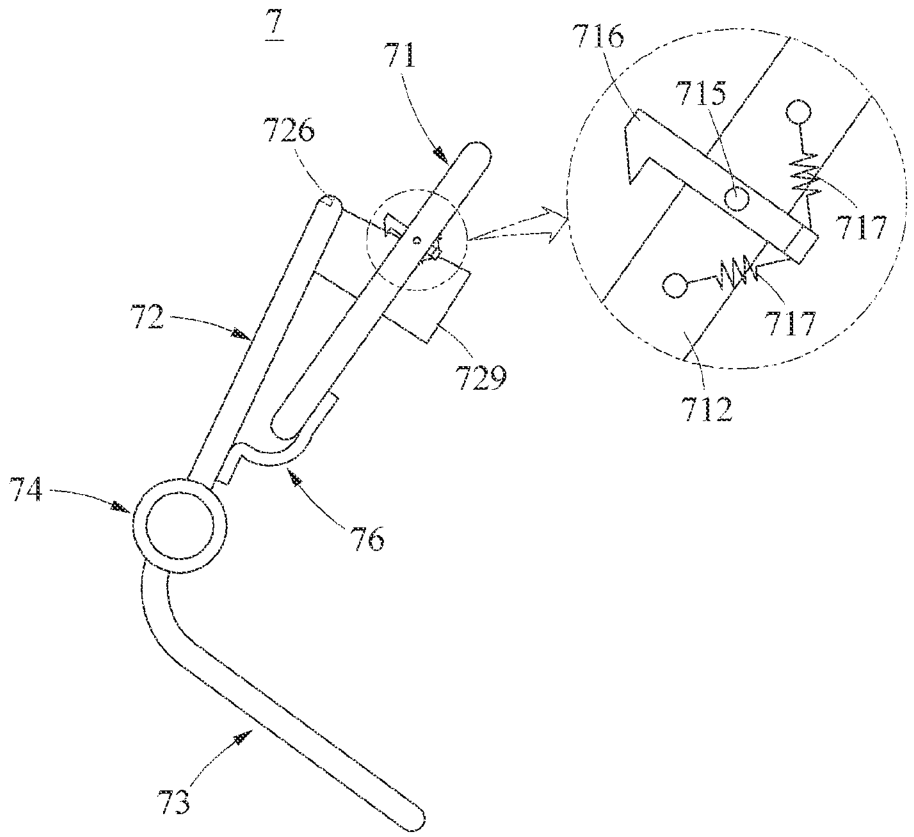
FIG. 11 is a side view illustrating a motion assistance apparatus including a fixer being decoupled from a thigh frame according to at least one example embodiment.
Figure 12:
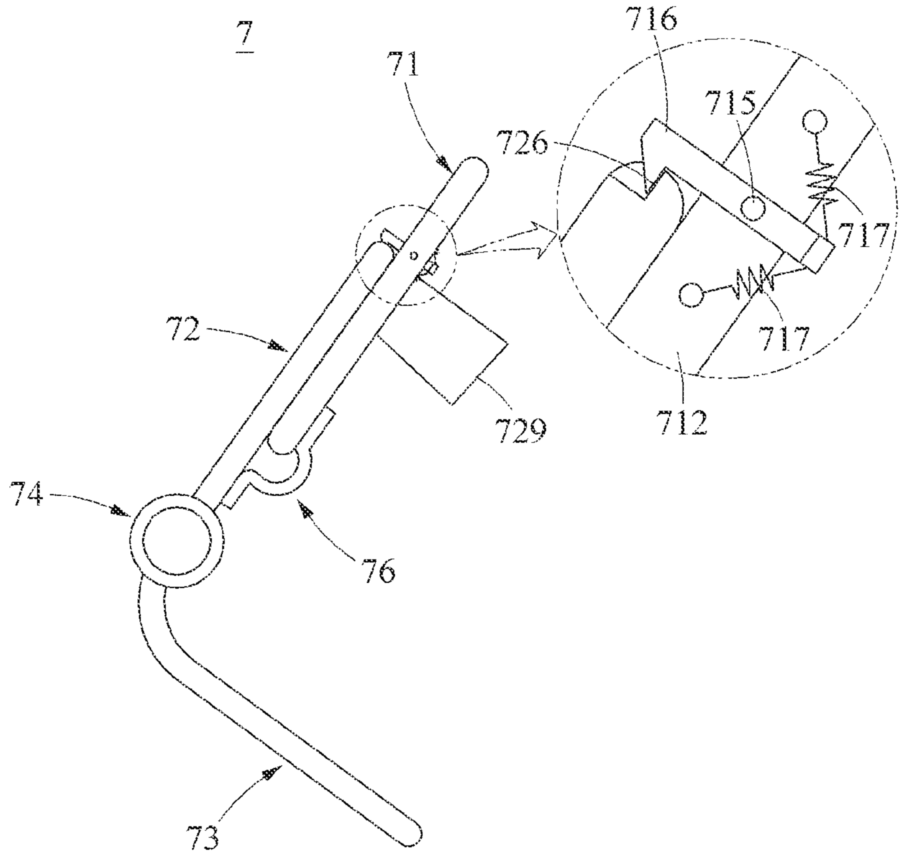
FIG. 12 is a side view illustrating a motion assistance apparatus including a fixer being coupled to a thigh frame according to at least one example embodiment.

FIG. 11 is a side view illustrating a motion assistance apparatus including a fixer being decoupled from a thigh frame according to at least one example embodiment, and FIG. 12 is a side view illustrating the motion assistance apparatus including the fixer being coupled to the thigh frame according to at least one example embodiment.

Referring to FIGS. 11 and 12, a motion assistance apparatus 7 may include a driving frame 71, a thigh frame 72, a shank frame 73, a joint 74, and a connector 76. The joint 74 may be a portion to which the thigh frame 72 and the shank frame 73 are rotatably connected. A thigh support 729 may be positioned farther than the connector 76, from a rotation axis of the shank frame 73.

A first end of the connector 76 may be connected to the driving frame 71 and a second end of the connector 76 may be connected to the joint 74, whereby the connector 76 may transmit power of the driving frame 71 to the shank frame 73. For example, the second end of the connector 76 may be connected to one of the thigh frame 72 and the shank frame 73.

The motion assistance apparatus 7 may further include a fixer to restrict a relative motion of the thigh frame 72 with respect to the driving frame 71. For example, the fixer may be on one of the driving frame 71 and the thigh frame 72. Hereinafter, for ease of description, an example in which the fixer is on the driving frame 71 will be described. However, example embodiments are not limited thereto.

The fixer may include a fixing rotation axis 715, a fixing body 716, and a fixing spring 717.

The fixing rotation axis 715 may be formed on a first side of a driving frame body 712.

The fixing body 716 may rotate clockwise or counterclockwise about the fixing rotation axis 715. The fixing body 716 may have a shape that fixes the thigh frame 72 to the driving frame 71. For example, the fixing body 716 may include a head that protrudes downward and is hung on the thigh frame 72. The thigh frame 72 may include a head receiver 726 having a shape that receives the head.

The fixing spring 717 may maintain an angle of the fixing body 716 with respect to the driving frame 71 when an external force is not applied to the fixing body 716. For example, the fixing spring 717 may connect an end portion of the fixing body 716 and the driving frame body 712. The fixing spring 717 and the head of the fixing body 716 may be connected to opposite sides of the fixing rotation axis 715. A plurality of fixing springs 717 may be disposed.

The motion assistance apparatus 7 may decouple the driving frame 71 and the thigh frame 72 when assisting a motion that applies a relatively great load to a knee joint, for example, a motion of standing up from a sitting position, thereby reducing a magnitude of power transmitted from the thigh frame 72 to the driving frame 71. Further, the motion assistance apparatus 7 may restrain the driving frame 71 and the thigh frame 72 when assisting a motion that applies a relatively small load to the knee joint, for example, a motion of level walking, thereby reducing a DOF and efficiently transmitting the power to a user.

The fixer was described with reference to FIGS. 11 and 12. However, the fixer may also be applied to other example embodiments, for example, all the motion assistance apparatuses of FIGS. 1 through 10.

Figure 13:
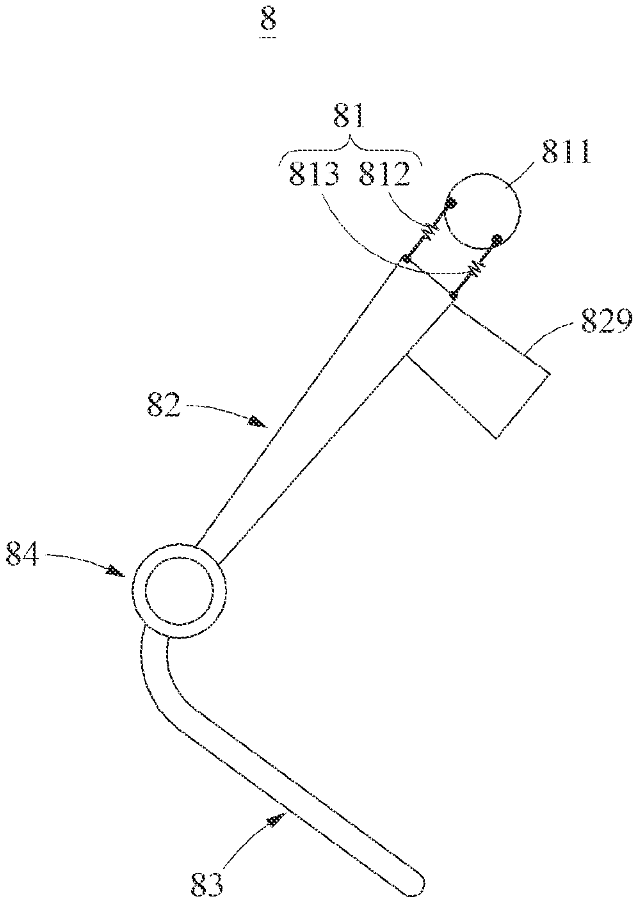
FIG. 13 is a side view illustrating a motion assistance apparatus according to at least one example embodiment.
Figure 14:
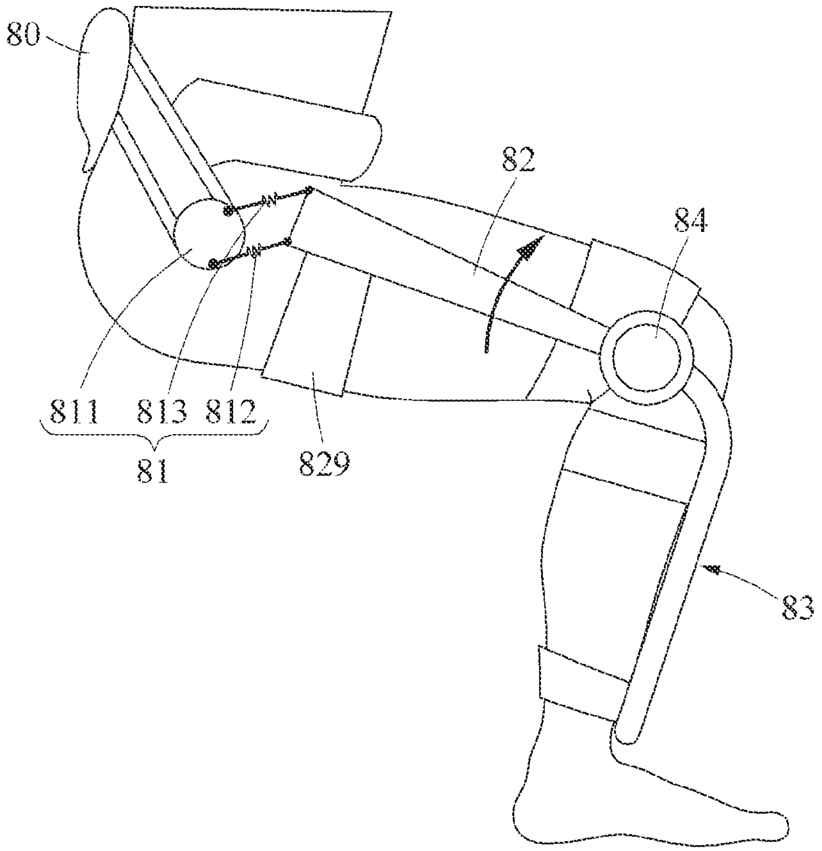
FIG. 14 is a side view illustrating an initial position of a user wearing a motion assistance apparatus when the user stands up from a sitting position according to at least one example embodiment.
Figure 15:
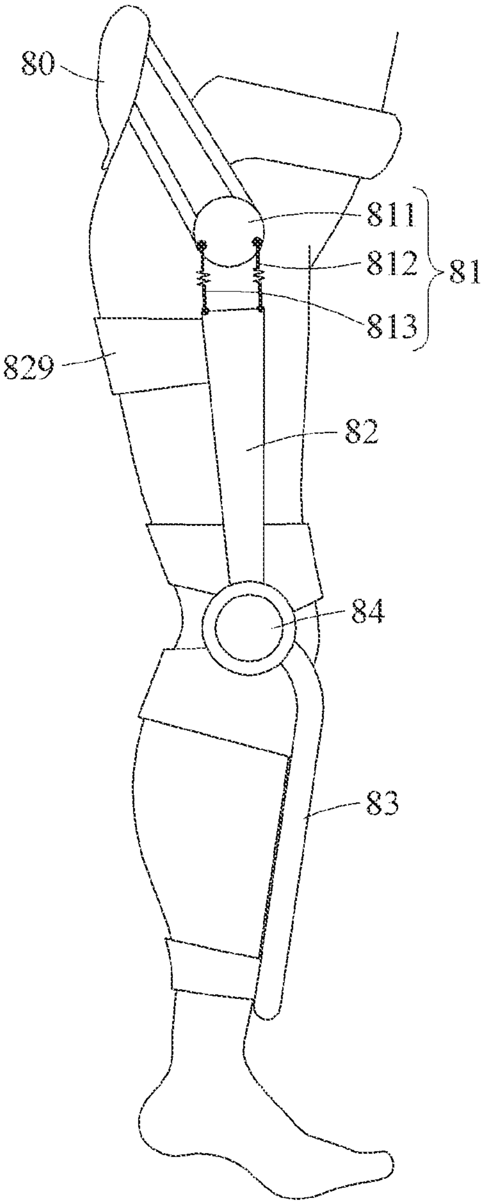
FIG. 15 is a side view illustrating a standing erect position of a user wearing a motion assistance apparatus according to at least one example embodiment.

FIG. 13 is a side view illustrating a motion assistance apparatus according to at least one example embodiment, FIG. 14 is a side view illustrating an initial position of a user wearing the motion assistance apparatus when the user stands up from a sitting position according to at least one example embodiment, and FIG. 15 is a side view illustrating a standing erect position of the user wearing the motion assistance apparatus according to at least one example embodiment.

Referring to FIGS. 13 through 15, a motion assistance apparatus 8 may include a wearable portion 80, a driver 81, a thigh frame 82, a shank frame 83, and a joint 84. The thigh frame 82 may include a thigh support 829.

The driver 81 may assist a motion of a hip joint of a user. The driver 81 may be connected to the wearable portion 80. For example, the driver 81 may receive power from the hip joint driver 104 of FIG. 1 formed on a first side of the wearable portion 80. The driver 81 may include a driving end portion 811, a first driving link 812, and a second driving link 813.

The driving end portion 811 may rotate using the power received from the hip joint driver 104 of FIG. 1. For example, the driving end portion 811 may rotate about a rotation axis coincident with a rotation axis of the hip joint of the user.

A first end of each of the first driving link 812 and the second driving link 813 may be connected to the thigh frame 82 by a hinge, and a second end of each of the first driving link 812 and the second driving link 813 may be connected to the driving end portion 811 by a hinge. That is, each of the first driving link 812 and the second driving link 813 may perform a 1-DOF rotational motion with respect to the thigh frame 82 and the driving end portion 811. The first driving link 812 and the second driving link 813 may be a predetermined distance spaced apart from each other. The first driving link 812 and the second driving link 813 may each have an elasticity.

By the above structure, in an initial state of the user when the user stands up from a sitting position, the thigh frame 82 may rotate about the joint 84 with respect to the shank frame 83. In this example, the thigh frame 82 may be connected to the driving end portion 811 by the plurality of driving links 812 and 813 each having an elasticity. Thus, as shown in FIG. 14, transmission of a torque for assisting a knee joint to the wearable portion 80 may be reduced.

For example, a relatively small torque may be applied to the thigh frame 82 when assisting a level-walking motion requiring a small force, and thus relative motions between the thigh frame 82 and the driving links 812 and 813 may scarcely occur. While assisting a motion of the hip joint, like the level-walking motion, a great torque may not be applied to the thigh frame 82, and the relative motions between the thigh frame 82 and the driving links 812 and 813 may be practically restricted. While assisting the motion of the hip joint, the driving links 812 and 813 may not change a position of the joint 84 practically. Meanwhile, a relatively great torque may be applied to the thigh frame 82 when assisting a motion of standing up from a sitting position, which requires a great torque, and thus the relative motions between the thigh frame 82 and the driving links 812 and 813 may occur with a great degree. The above mechanism may improve a wearability that the user feels.

In some example embodiments, the motion assistance apparatus 1 may further include a controller (not shown) that includes memory and processing circuitry.

The memory may include at least one of a volatile memory, non-volatile memory, random access memory (RAM), a flash memory, a hard disk drive, and an optical disk drive.

The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design or execution of computer readable instructions stored in a memory (not shown), as a special purpose computer to control the hip driver 104 and/or the fixing body 716 of the fixer.

For example, the processing circuitry may be configured to control the hip driver 104 to generate the power to rotate the driving frame 11 such that the generated power is transmitted to the shank frame 13.

In some example embodiments, the processing circuitry may also be configured to control the fixing body 716 of the fixer to selectively latch the thigh frame 72 and the driving frame 71.

For example, the fixer may include an electromagnet, and the processing circuitry may selectively activate or deactivate the electromagnet to connect the thigh frame 72 and the driving frame 71.

In some example embodiments, the processing circuitry may be connected to one or more sensors (not shown), and receive sensor data from the one or more sensors to determine whether the user is walking level, performing the motion of climbing the sloping hill or standing up, and may control the motion assistance apparatus 1 based on a result of the sensing.

For example, the processing circuitry may selectively latch the thigh frame 72 and the driving frame 71 in response to the sensor data indicating that the user is walking level, thereby reducing a DOF and efficiently transmitting the power to a user. Further, the processing circuitry may selectively decouple the thigh frame 72 and the driving frame 71 in response to the sensor data indicating that the user is climbing the sloping hill or standing up, thereby reducing a magnitude of power transmitted from the thigh frame 72 to the driving frame 71.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion assistance apparatus, comprising:

a shank frame comprising a first end and a second end and configured to support a shank of a user;

a thigh frame comprising a first end and a second end, the thigh frame is configured to rotate relative to the shank frame, and to support a thigh of the user, and when the motion assistance apparatus is worn by the user in a standing position, the second end is a highest end of the thigh frame;

a joint rotatably coupled to the first end of the shank frame and rotatably coupled to the first end of the thigh frame;

a driving frame disposed adjacent to the thigh frame and comprising a first end disposed between the first end of the thigh frame and a the second end of the thigh frame and the driving frame extends along a length of the thigh frame such that a second end of the driving frame extends past the second end of the thigh frame, wherein the second end of the driving frame is positioned at an elevation higher than the second end of the thigh frame when the motion assistance apparatus is worn by the user in the standing position, and the driving frame is configured to drive the thigh frame and to assist a motion of a hip joint of the user at least by transmitting a power from the driving frame to the shank frame; and a connector comprising a first end and a second end, the first end of the connector directly connected to the first end the driving frame and the second end of the connector connected to the thigh frame such that the connector is configured to transmit the power of the driving frame indirectly to the shank frame, wherein the thigh frame is configured to move relative to the driving frame, wherein the thigh frame includes a thigh support configured to support a rear surface of the thigh of the user, and wherein the connector is configured to have elasticity.

2. The motion assistance apparatus of claim 1, wherein the connector is configured to expand based on an angle between the driving frame and the thigh frame increasing and to contract based on the angle decreasing.

3. The motion assistance apparatus of claim 1, wherein the connector is configured to, based on an external force not being provided, provide an elastic restoring force such that the thigh frame is positioned in closer contact with the driving frame.

4. A motion assistance apparatus, comprising:

a shank frame configured to support a shank of a user;

a thigh frame comprising a first end and a second end, the thigh frame is configured to rotate relative to the shank frame, and to support a thigh of the user, and when the motion assistance apparatus is worn by the user in a standing position, the second end is a highest end of the thigh frame;

a joint rotatably coupled to a first end of the shank frame and rotatably coupled to the first end of the thigh frame;

an elongated driving frame disposed adjacent to the thigh frame and comprising a first end disposed between the first end of the thigh frame and the second end of the thigh frame and the elongated driving frame extends along a length of the thigh frame such that a second end of the elongated driving frame extends past the second end of the thigh frame, wherein the second end of the elongated driving frame is positioned at an elevation higher than the second end of the thigh frame when the motion assistance apparatus is worn by the user in the standing position, and the elongated driving frame is configured to drive the thigh frame and to assist a motion of a hip joint of the user at least by transmitting a power provided to the second end of the elongated driving frame to the shank frame via the first end of the elongated driving frame; and a connector comprising a first end and a second end, the first end of the connector directly connected to the first end of the elongated driving frame and the second end of the connector connected to the thigh frame so that the connector is configured to transmit the power of the elongated driving frame indirectly to the shank frame via at least the thigh frame.

5. The motion assistance apparatus of claim 4, wherein the connector is configured to connect the thigh frame and the elongated driving frame so that the thigh frame and the elongated driving frame are to rotate separately on parallel planes.

6. The motion assistance apparatus of claim 5, wherein the connector is configured to have elasticity.

7. The motion assistance apparatus of claim 4, wherein the connector comprises a one-degree of freedom (1-DOF) rotating joint.

8. The motion assistance apparatus of claim 4, wherein the connector is configured to expand based on an angle between the elongated driving frame and the thigh frame increasing and to contract based on the angle decreasing.

9. The motion assistance apparatus of claim 4, wherein the connector is configured to, based on an external force not being provided, provide an elastic restoring force such that the thigh frame is positioned in closer contact with the elongated driving frame.

10. A motion assistance apparatus, comprising:

a shank frame comprising a first end and a second end and configured to support a shank of auser;

a thigh frame comprising a first end and a second end, the thigh frame is configured to rotate relative to the shank frame, and to support a thigh of the user, and when the motion assistance apparatus is worn by the user in a standing position, the second end is a highest end of the thigh frame;

a joint rotatably coupled to the first end of the shank frame and rotatably coupled to the first end of the thigh frame;

a driving frame disposed adjacent to the thigh frame and comprising a first end disposed between the first end of the thigh frame and the second end of the thigh frame and the driving frame extends along a length of the thigh frame such that a second end of the driving frame extends past the second end of the thigh frame, wherein the second end of the driving frame is positioned at an elevation higher than the second end of the thigh frame when the motion assistance apparatus is worn by the user in the standing position, and the driving frame is configured to drive the thigh frame and to assist a motion of a hip joint of the user at least by transmitting a power from the driving frame to the shank frame; and a clasp configured to restrict a relative motion of the thigh frame with respect to the driving frame, wherein the clasp includes a fixing body rotatably connected to the driving frame, the fixing body comprises a head, the second end of the thigh frame comprises a head receiver having a shape configured to receive the head, and the head is configured to attach to the thigh frame via the head receiver to the second end of the thigh frame and to restrict relative motion of the thigh frame with respect to the driving frame, and the thigh frame is configured to move relative to the driving frame when the head is not attached to the thigh frame via the head receiver.

11. The motion assistance apparatus of claim 10, wherein the clasp further includes a fixing spring configured to maintain an angle of the fixing body with respect to the driving frame when an external force is not applied to the fixing body.

12. The motion assistance apparatus of claim 10, further comprising a connector comprising a first end and a second end, the first end of the connector directly connected to the first end of the driving frame and the second end of the connector connected to the thigh frame so that the connector is configured to transmit the power of the driving frame indirectly to the shank frame via at least the thigh frame, wherein the connector is configured to, based on an external force not being provided, provide an elastic restoring force such that the thigh frame is positioned in closer contact with the driving frame.

* * * * *